(12) United States Patent
Kirchner et al.

(10) Patent No.: US 10,820,971 B2
(45) Date of Patent: Nov. 3, 2020

(54) METHOD OF MAKING A DENTAL RESTORATION

(71) Applicant: 3M INNOVATIVE PROPERTIES COMPANY, St. Paul, MN (US)

(72) Inventors: Bastian P. Kirchner, Fuerstenfeldbruck (DE); Till Meurer, Bonn (DE); Dajana Zimmermann, Eching am Ammersee (DE)

(73) Assignee: 3M Innovative Properties Company, St. Paul, MN (US)

( * ) Notice: Subject to any disclaimer, the term of this patent is extended or adjusted under 35 U.S.C. 154(b) by 504 days.

(21) Appl. No.: 15/528,617

(22) PCT Filed: Nov. 30, 2015

(86) PCT No.: PCT/US2015/062897
§ 371 (c)(1),
(2) Date: May 22, 2017

(87) PCT Pub. No.: WO2016/089723
PCT Pub. Date: Jun. 9, 2016

(65) Prior Publication Data
US 2017/0258565 A1    Sep. 14, 2017

(30) Foreign Application Priority Data

Dec. 2, 2014 (EP) .................................... 14195764

(51) Int. Cl.
*A61C 13/08* (2006.01)
*A61C 5/77* (2017.01)
(Continued)

(52) U.S. Cl.
CPC .............. *A61C 13/082* (2013.01); *A61C 5/77* (2017.02); *A61C 13/0006* (2013.01);
(Continued)

(58) Field of Classification Search
CPC .......................... A61C 13/082; A61C 13/0022
See application file for complete search history.

(56) References Cited

U.S. PATENT DOCUMENTS

| 7,981,531 B2 | 7/2011 | Rheinberger |
| 2006/0082033 A1 | 4/2006 | Hauptmann |

(Continued)

FOREIGN PATENT DOCUMENTS

| CN | 101548911 | 10/2009 |
| GB | 108570 | 8/1917 |

(Continued)

OTHER PUBLICATIONS

International Search Report for PCT International Application No. PCT/US2015/062897, dated Feb. 11, 2016, 5pgs.

*Primary Examiner* — Christopher T Schatz

(57) ABSTRACT

A method of making a dental restoration has the step of providing a precursor of the dental restoration. The dental restoration has at least a first and a second surface portion which are delimited by a physical boundary structure. The method further has the steps of applying a first coloring solution associated with the first surface portion onto the first surface portion, sintering the dental restoration precursor, and removing the physical boundary structure.

12 Claims, 4 Drawing Sheets

(51) Int. Cl.
*A61C 13/00* (2006.01)
*A61C 13/083* (2006.01)
*A61C 13/34* (2006.01)

(52) U.S. Cl.
CPC ........ *A61C 13/0022* (2013.01); *A61C 13/083* (2013.01); *A61C 13/34* (2013.01); *A61C 13/0003* (2013.01); *A61C 2201/002* (2013.01)

(56) References Cited

U.S. PATENT DOCUMENTS

| | | | |
|---|---|---|---|
| 2009/0042167 A1* | 2/2009 | Van Der Zel | A61C 1/084 433/215 |
| 2011/0306017 A1* | 12/2011 | Tanaka | A61C 13/082 433/203.1 |
| 2013/0224454 A1* | 8/2013 | Jung | A61C 13/0004 428/213 |

FOREIGN PATENT DOCUMENTS

| | | |
|---|---|---|
| WO | WO 2013-164411 | 11/2013 |
| WO | WO 2014-037735 | 3/2014 |
| WO | WO 2014-046949 | 3/2014 |

\* cited by examiner

METHOD OF MAKING A DENTAL RESTORATION

FIELD OF THE INVENTION

The invention relates to a method of making a dental restoration, and in particular to a method in which first and second surface portions are delimited by a physical boundary structure and in which at least the first surface portion is colored with an associated coloring solution.

BACKGROUND ART

Dental restorations, in particular larger dental restorations like replacement teeth, crowns or bridges, for example, can be made in different configurations depending on a variety of criteria. Such criteria include for example the desired aesthetics, costs, preparation time or capabilities of a selected manufacturer.

Many dental restorations are made as a two or more component configuration, with the individual components providing different characteristics for the restoration. A common two-component configuration includes a dental restoration prepared from a framework which is provided with a veneer. The framework typically provides the dental restoration with a good mechanical stability and the veneer typically provides the dental restoration with the desired good aesthetics. Typically the framework and the veneer are made of different base materials, for example ceramic and glass-ceramic, each being selected in accordance with the desired function of the respective component.

Other dental restorations are made of a single component only and are often referred to as monolithic dental restorations in the field of dentistry. Such monolithic dental restorations typically are made of one mechanically stable material, for example a ceramic material, and do not have an additional veneer.

From monolithic dental restorations so-called all-ceramic restorations have become relatively common. Such monolithic all-ceramic restorations may be manufactured from ceramic blocks by grinding. The ceramic material these blocks are made of may be provided at a final stage, for example sintered or cast to final density prior to grinding, so that the dental restoration is ready to use directly after grinding which eventually includes a final polishing step. Suitable ceramic blocks are commercially available at different pre-determined tooth colors so that the desired color of the dental restoration can be determined by selecting a block having the appropriate color.

Alternatively, monolithic all-ceramic restorations can be made from pre-sintered ceramic blocks. Such pre-sintered ceramic blocks typically have an open-celled material structure, as for example obtainable by pre-sintering a ceramic powder to a stage at which the powder particles adhere to each other but leave voids in between. A precursor of the dental restoration can typically be milled from such a pre-sintered ceramic block and that precursor can be converted into the dental restoration in a sintering step. Pre-sintered ceramic blocks are often provided at a standard color. The dental restoration can be provided with a desired tooth color by soaking the dental restoration precursor with a so-called coloring solution, as for example disclosed in WO 2014/046949 A1.

Although current approaches for manufacturing of monolithic dental restorations provide a variety of advantages, there is still a desire for a method allowing the manufacturing of individually colored monolithic dental restorations at a cost efficient manner and at a good aesthetic quality.

SUMMARY OF THE INVENTION

The invention relates to a method of making a dental restoration. The method comprises the steps of:

providing a precursor of the dental restoration which has an outer surface, the outer surface having at least a first and a second surface portion which are delimited by a physical boundary structure;

applying a first coloring solution associated with the first surface portion onto the first surface portion;

sintering the dental restoration precursor to form a preliminary dental restoration; and removing the physical boundary structure to form the dental restoration.

The steps of sintering and removing the physical boundary structure may be performed in any order without departing from the invention. For example the method of the invention encompasses the steps of removing the physical boundary structure to form the dental restoration precursor to form a preliminary dental restoration, and sintering the preliminary dental restoration to form the dental restoration.

The invention is advantageous in that it allows an individual coloring of monolithic dental restorations. Further the inventions helps a user applying one or more coloring solutions to appropriate areas of the dental restoration. The invention thus helps in manufacturing monolithic dental restorations at relatively high aesthetic quality and at minimized costs.

The method of the invention preferably concerns the making of a monolithic dental restoration, in particular of an all-ceramic dental restoration.

For the purpose of the present specification the outer surface and an inner surface of dental restoration precursor in combination form the entire surface of the dental restoration precursor. In this regard the inner surface refers to a surface which is intended or prepared for mating with a dental substructure in a patient's mouth.

In an embodiment the step of removing the physical boundary structure involves machining, for example grinding, polishing and/or milling.

Preferably the first surface portion and the second surface portion are associated to the same vestibular (buccal and/or labial) surface of the dental restoration. Accordingly, the first and second surface portion may in combination form a surface precursor of at least a part of the vestibular surface of the dental restoration. The first and second surface portion may form the basis for creating the vestibular surface of the dental restoration. For example, sub-portions of each of the first and second surface portion may correspond in shape to the shape of the vestibular surface of the dental restoration or to a proportional three-dimensionally enlarged shape of the vestibular surface of the dental restoration. In this regard the term "proportional three-dimensionally enlarged" encompasses an enlargement by equal or different factors for each dimension, based on one or more shrinking factors determined for sintering of the material the dental restoration precursor is made of.

The first surface portion and the second surface portion may be further associated to the same occlusal surface of the dental restoration or a vestibular surface and an occlusal surface of the same dental restoration.

In an embodiment the dental restoration is made of a dental ceramic or a dental glass-ceramic material, and the dental restoration precursor is made of a corresponding pre-sintered powder that forms or converts into the dental ceramic or dental glass-ceramic material, respectively, by sintering.

In an embodiment the method further comprises the step of applying a second coloring solution associated with the second surface portion onto the second surface portion. The first coloring solution and second coloring solution are preferably based on different compositions for providing the dental restoration with a first tooth color and a different second tooth color, respectively.

In a further embodiment at least the first surface portion comprises first physical indicia that are indicative of a first dental restoration color associated with the first surface portion. Further, the second surface portion may comprise second physical indicia that are indicative of a different second dental restoration color associated with the second surface portion. The first physical indicia may be formed of a surface structure that comprises first surface structure elements of a repetitive geometrically defined shape. The second physical indicia may be formed of a further surface structure that comprises different second surface structure elements of a repetitive geometrically defined shape. In particular, the first and second surface structure elements may each comprise a plurality of uniformly spaced elongated bulges, or a plurality of projections of a repetitive shape. The bulges may extend parallel relative to each other. Further the shape of the projections may be selected from among a circular area, a hexagonal area, a rectangular area or a combination thereof. The bulges are preferably uniformly spaced and/or uniformly sized. Thus, the bulges may form a structural hatching. Further the projections may be uniformly spaced and/or uniformly sized. Accordingly, the projections may form a structural pattern. Such a hatching or pattern (or different hatchings or patterns) may be easily recognizable and distinguishable, for example by a user. The first and second surface structure elements may be distributed over the entire first and second surface portion, respectively.

In one embodiment the physical boundary structure is formed by the change-over between the first and second surface structure elements at the boundary between the first and the second surface portion. For example the change-over between two different patterns based on regularly shaped and arranged structures are typically visually recognizable, for example by a user.

In a further embodiment the physical indicia embodies a code. The code may be selected from among one or more digits, one or more characters, alphanumerical information or symbols. In a particular embodiment the code corresponds to an encoded tooth color, for example based on the VITA classical A1-D4 shade system as available from the company VITA Zahnfabrik, Germany.

In a further embodiment the boundary structure is formed by a continuous bulge protruding from the dental restoration precursor on the boundary between the first and second surface portion. The bulge may extend along a portion of the boundaries between the first and the second surface portion in which the boundaries coincide. In other words, the bulge may extend along a line in which the first and second surface portions directly adjoin. Accordingly the bulge helps to recognize the boundary between the first and second surface portion during applying the first and second coloring solutions.

In an embodiment the method further comprising the steps of:
providing a virtual three-dimensional model of the dental restoration;
defining a first boundary of the first surface portion associated with a desired first dental restoration color;
defining a second boundary of the second surface portion associated with a desired second dental restoration color;
along at least a portion of the first boundary and the second boundary in which the first boundary and the second boundary coincide, building up a virtual boundary structure; and
creating a three-dimensional model of the dental restoration precursor based on the dental restoration model and the virtual boundary structure.

The first and second boundaries are preferably defined on the dental restoration model by computer aid.

In a further aspect the invention relates to a kit of parts which comprises a plurality of different coloring solutions, and instructions for use defining the steps of the method of the invention. The kit of parts may further comprise information about which particular coloring solutions and particular physical indicia being associated to each other. Such information may be provided digitally (for example in a computer) or physically (for example on a written or printed listing). Further the kit of parts may comprise at least one applicator, for example a brush or pen, for applying one or more of the coloring solutions.

DETAILED DESCRIPTION OF THE INVENTION

Figure 1:
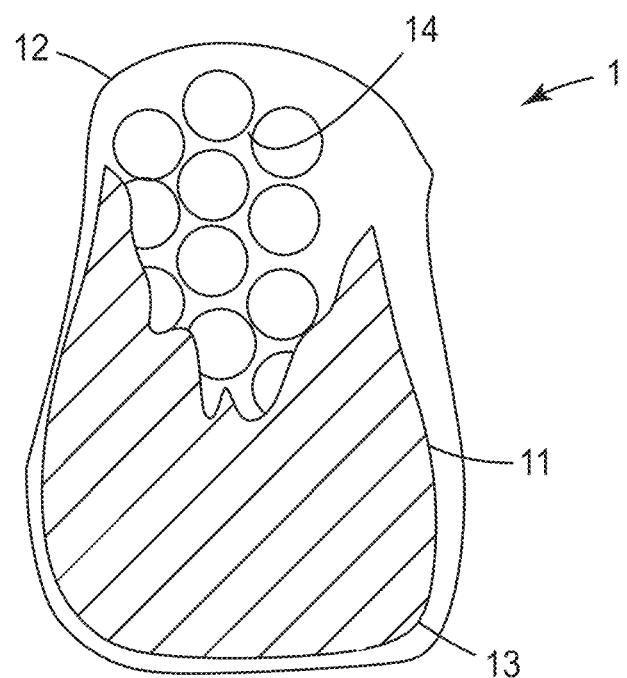
FIG. 1 is a front view of a dental restoration precursor at a stage in the method according to an embodiment of the invention.

FIG. 1 shows a dental restoration precursor 1 made of a pressed and/or pre-sintered ceramic or glass-ceramic material. The ceramic or glass-ceramic material of the dental restoration precursor 1 has an open-celled material structure. For forming the finished dental restoration the open-celled ceramic or glass-ceramic material is sintered at a later stage. Sintering causes the voids formed in the open-celled material structure to be substantially removed. Thereby the glass-ceramic material shrinks essentially proportionally in three-dimensions. The skilled person will however recognize that, depending on the pressing technique used to prepare the ceramic or glass-ceramic material shrinkage may not be absolutely isotropic so that the shrinkage may occur at slightly different factors in the three dimensions. Such shrinkage factors are however typically reproducible and associated with the process used to prepare the material, and therefore can be determined in advance of any sintering for such a material.

The dental restoration precursor 1 has a first surface portion 11 and a second surface portion 12. The first and second surface portion 11, 12 are portions of an outer surface of the dental restoration precursor. The first surface portion 11 has first physical indicia 13 and the second surface portion 12 has second physical indicia 14. In the example the first physical indicia 13 comprise uniformly spaced linear bulges, particularly in a pattern of a hatching, whereas the second physical indicia 14 comprise surface structure elements in the form of a raised pattern, in particular a pattern defining uniformly spaced and sized dots between. The first and second physical indicia 13, 14 form raised structures with respect to a proportionally three-dimensionally enlarged outer surface of the finished (sintered) dental restoration.

The first physical indicia 13 is indicative of a first coloring solution to be applied on the first surface portion 11, and the second physical indicia 14 is indicative of a second coloring solution to be applied on the second surface portion 12. A user, for example a dental technician, therefore is enabled to identify the appropriate coloring solution to be applied onto the first and/or second surface portion 11, 12 directly from the respective first and/or second surface portion 11, 12. The first and second coloring solution each are configured to provide the finished dental restoration with a first and second dental restoration color, respectively.

Further, in the example the first physical indicia 13 and the second physical indicia 14 each visibly define the first and second surface portion 11, 12, respectively. In particular, each of the surface structure elements forming the first and second indicia 13, 14 are distributed over the entire first and second surface portion 11, 12, respectively, and thus also define a boundaries of the first and second surface portion 11, 12. The boundary between the first and second surface portion is also clearly visible from the change-over between the differently structured physical indicia 13, 14. In this example therefore the change-over between the different patterns of the physical indicia form the physical boundary of the invention. Therefore, the user is enabled to recognize the boundaries of the first and second surface portion 11, 12, and to apply the respective first and second coloring solution to the appropriate area of the first and second surface portion 11, 12.

Figure 2:
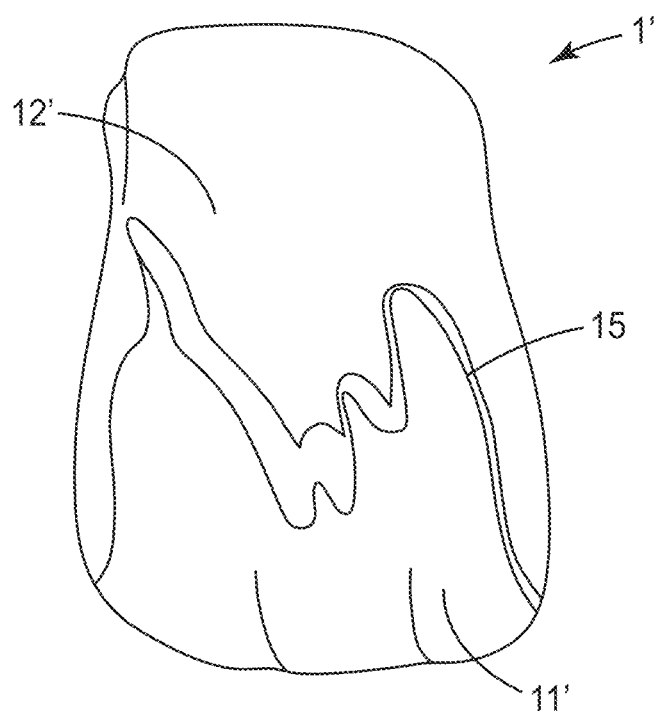
FIG. 2 is a front view of a further dental restoration precursor at a stage in the method according to an embodiment of the invention.

FIG. 2 shows a dental restoration precursor 1' which has a first surface portion 11' and a second surface portion 12'. The dental restoration precursor 1' has physical boundary structure which in the example is a raised bulge 15 continuing along the boundary between the first and second surface portion. In the example the first and second surface portion 11', 12' do not have physical indicia. However, the first and second surface portion 11', 12' each are associated with a first and a different second coloring solution to be applied on the first and second surface portion 11', 12'. According to a method step of the invention information about a particular coloring solution to be used for the associated surface portion of the dental restoration precursor may be provided, for example displayed on a computer display or as printed information.

The raised bulge 15 optically indicates to a user, for example a dental technician, the boundary between the first and second surface portion 11', 12'. Further, raised bulge 15 physically hinders any coloring solution applied on the first or second surface portion 11', 12' in flowing beyond the raised bulge 15 toward the respective other first or second surface portion 11', 12'. Therefore the raised bulge 15 is capable of physically helping a user to provide the coloring solution precisely to desired surface portions of the dental restoration precursor.

Figure 3A:
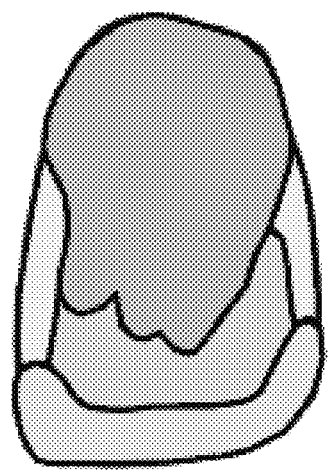
FIG. 3A, 3B illustrate color measuring steps in a method according to an embodiment of the invention.

FIG. 3A illustrates a manual method of determining a color structure of a patient's tooth. The method is performed by determining multiple colors from a patient's tooth, for example by use of a shade guide or a color measuring device for measuring a color of a surface spot. The so determined colors are mapped, for example manually on paper, in a color landscape.

Figure 3B:
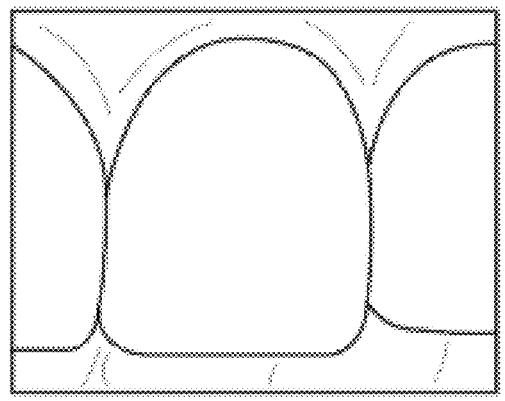
Figure 3B:
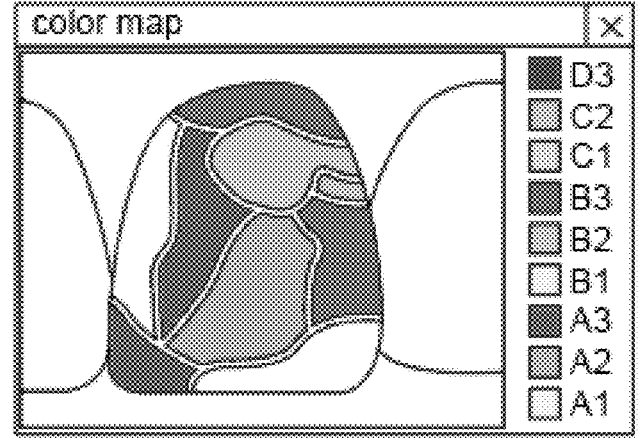

FIG. 3B illustrates a computer-implemented method of determining a color structure of a patient's tooth. The method is performed by using a color measurement device which is configured to measure and display multiple colors, for example in the form of a color landscape, on a computer screen. In one step of the method an image of a patient's tooth is captured. In the example the image is taken as a color image, for example using a CCD-sensor in the form of image data comprising information about a particular color present at a particular coordinate of the image. Based on the image data color a posterized color landscape is created, in which contiguous areas of a similar color are averaged to one common color approximating the colors in the respective area. In the example posterization is based on standard tooth colors of a pre-determined shade system. A common shade system is for example provided under the designation VITA classical A1-D4 from the company VITA Zahnfabrik, Germany. Accordingly the color measurement device has software with functionality to determine a deviation between a measured color and a standard tooth color, and to assign the measured color to an appropriate standard tooth color which approximates the measured color best. A color measuring device as it may be used with the present invention is for example available under the designation SpectroShade™ from the company MHT S.r.l, Italy. The skilled person will recognize that other coloring measuring devices or methods, for example utilizing a physical shade guide or a single color measuring device may be used in combination with a manual preparation of a color landscape.

The software may have functionality to adjust the color resolution, meaning the number of different colors to which the captured or measured colors are assigned. In a relatively simple example the natural color gradation of a tooth may be represented by only two standard tooth colors. However, the invention further enables the representation of the natural color gradation in more than two standard tooth colors.

The boundaries of the different color areas are used to create the physical boundary structure either in the form of a regular pattern as illustrated in FIG. 1 or in the form of a bulge as shown in FIG. 2. Preferably in a previous step a three-dimensional virtual model of the dental restoration is provided. This step is known in the art of dentistry and may involve scanning of a situation in a patient's mouth and designing at least a part of the dental restoration based thereon. Any color landscape measured by the measuring device may be matched with the outer surface of the dental restoration. In the example the two-dimensional image as illustrated in FIG. 3A or 3B is (virtually or visibly) overlaid with a (two-dimensional) front view on the dental restoration model. The outer boundary of the image represents the boundary of the tooth in a plane perpendicular to the dimension from which the image was taken. Accordingly by matching the outer boundary of the image and the outer boundary of the dental restoration in a corresponding plane the boundaries of the color landscape can be transferred to the dental restoration in their appropriate size and shape. The skilled person will recognize that this step may not need to be performed absolutely precisely because the colors and color structure of the dental restoration may only be approximated. Hence the step of matching may be performed in the CAD system by help of an operator. Once the boundaries of the different color areas of the boundaries of the color landscape are transferred the physical boundary structure can be automatically created. This is known in the field of CAD in which a three-dimensional model of a line can be used to generate a virtual structure having a profile that extends along that line. In the example the profile of the physical boundary structure may generally correspond to a "D-profile" which faces the dental restoration model with its straight side (FIG. 2). Alternatively, regular patterns may be created based on three-dimensional protrusions from the dental restoration model as illustrated in FIG. 1.

The dental restoration model in the example—irrespective of the presence of the physical boundary structure—represents the dental restoration based on its final shape and dimensions, in particular after sintering. Accordingly the design can be performed without considering any sintering shrinkage at that stage. Once the design is finished the dental restoration model is three-dimensionally enlarged based on three factors which are based on the sintering shrinkage and a dental restoration precursor is machined or built up based on the three-dimensionally enlarged dental restoration precursor. FIGS. 4 to 10 illustrate the method of the invention in more detail.

Figure 4:
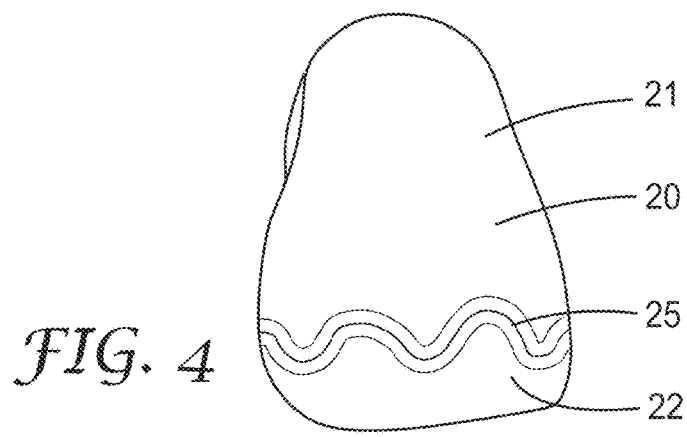
FIGS. 4-10 illustrate steps according to a method according to an embodiment of the invention.

FIG. 4 shows a dental restoration precursor 20 having a first surface portion 21, a second surface portion 22 and a physical boundary structure in the form of a raised bulge 25. The dental restoration precursor 20 is made of a pre-sintered open-celled ceramic material, in particular from a zirconia material.

Figure 5:
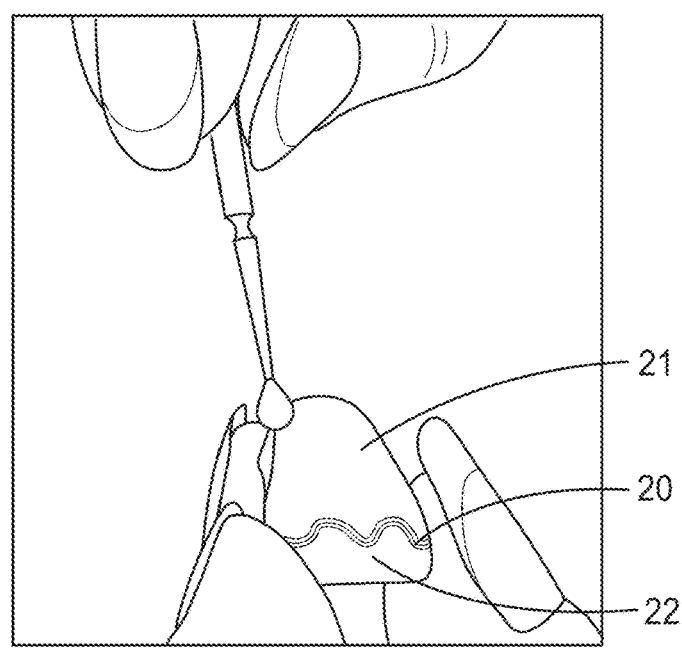

FIG. 5 illustrates the application of a first coloring solution onto the first surface portion 21 of the dental restoration precursor 20. The first coloring solution penetrates into the dental restoration precursor 20 due to the open-celled material structure and therefore does not substantially change the shape of the dental restoration precursor 20. The raised bulge 25 helps applying the first coloring solution precisely within the first surface portion 21, and also absorbs some of first coloring solution.

Figure 6:
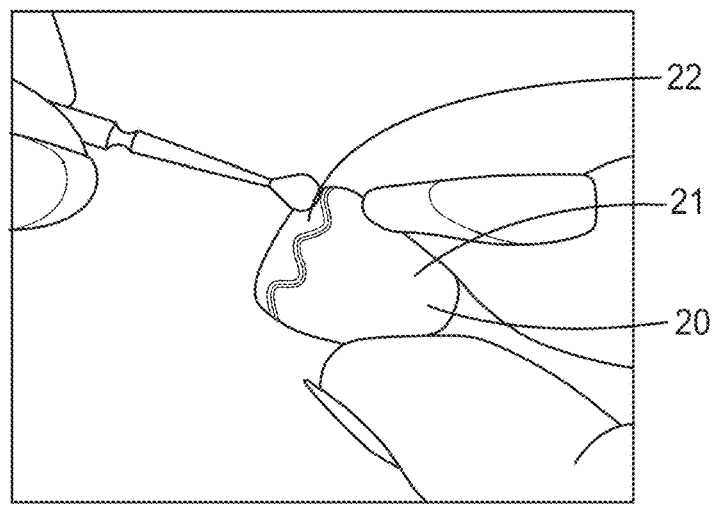

FIG. 6 illustrates the application of a second coloring solution onto the second surface portion 22 of the dental restoration precursor 20 in a similar manner as illustrated in FIG. 5. The raised bulge 25 correspondingly helps applying the second coloring solution precisely within the second surface portion 22. Further the raised bulge 25 absorbs some of the second coloring solution so that the raised bulge 25 comprises some of the first and second coloring solution. The raised bulge 15 thus comprises the first and second coloring solution which transition into each other. It has been found that this transition does not continue along a sharp line although the path of the raised bulge 15 may based on a sharp boundary between the first and second surface portion 21, 22. This provides the finished dental restoration with a natural appearance.

Figure 7:
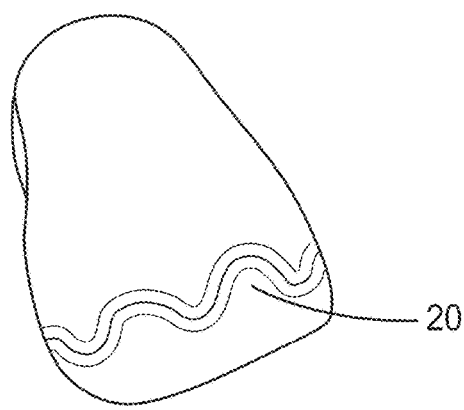

FIG. 7 shows the dental restoration precursor 20 after coloring with the first and second coloring solution.

Figure 8:
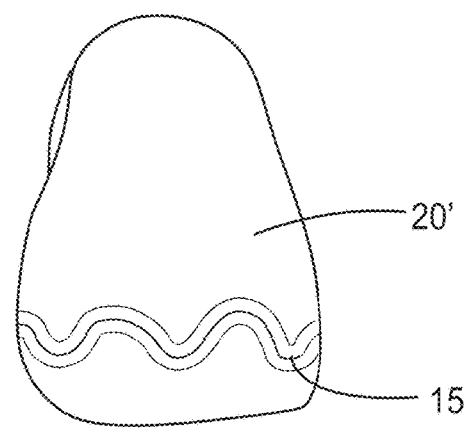

FIG. 8 shows the dental restoration precursor after sintering, herein referred to as preliminary dental restoration 20'. The raised bulge 15 is still present on the preliminary dental restoration, although the material structure of the raised bulge 15 has changed due to the sintering.

Figure 9:
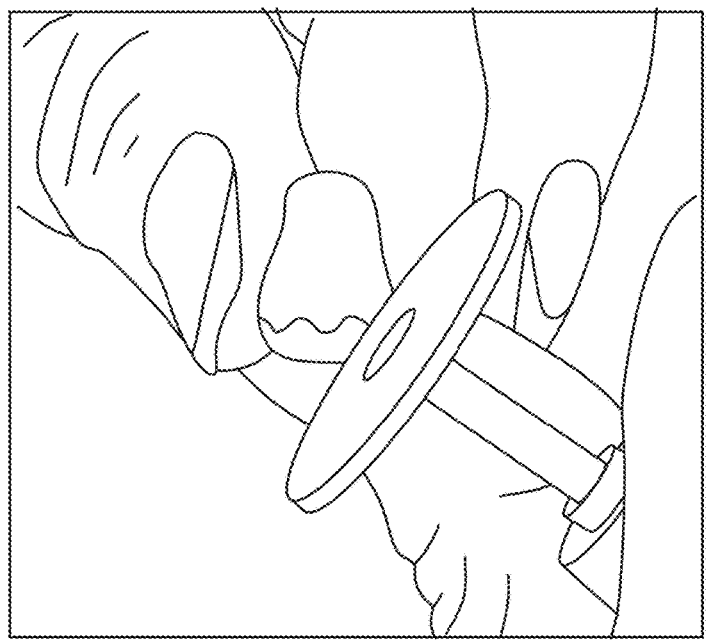
Figure 10:
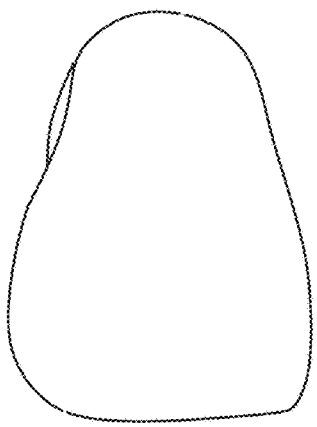

FIG. 9 illustrates the removal of the raised bulge (not visible anymore). Due to the penetration of the coloring solutions into the previously open-celled ceramic material the colors merge pleasantly into one another without forming a gap between as shown in FIG. 10.

The invention claimed is:

1. A method of making a dental restoration, comprising:
providing a precursor of the dental restoration which has an outer surface, the outer surface having at least a first and a second surface portion which are delimited by a physical boundary structure;
applying a first coloring solution associated with the first surface portion onto the first surface portion;
sintering the precursor of the dental restoration to form a preliminary dental restoration; and
removing the physical boundary structure to form the dental restoration;
wherein at least the first surface portion comprises first physical indicia indicative of a first dental restoration color associated with the first surface portion and wherein the first physical indicia are formed by a surface structure which comprises first surface structure elements of a repetitive geometrically defined shape.

2. The method of claim 1, further comprising applying a second coloring solution associated with the second surface portion onto the second surface portion.

3. The method of claim 1, wherein the first surface structure elements comprise a plurality of uniformly spaced elongated bulges, or a plurality of projections of a repetitive shape.

4. The method of claim 3, wherein the bulges extend parallel relative to each other, and wherein the shape of the projections is selected from the group consisting of a circular area, a hexagonal area or a rectangular area.

5. The method of claim 1, wherein the second surface portion comprises second physical indicia indicative of a second dental restoration color associated with the second surface portion.

6. A method of making a dental restoration, comprising:
providing a precursor of the dental restoration which has an outer surface, the outer surface having at least a first and a second surface portion which are delimited by a physical boundary structure;
applying a first coloring solution associated with the first surface portion onto the first surface portion;
sintering the precursor of the dental restoration to form a preliminary dental restoration; and
removing the physical boundary structure to form the dental restoration
wherein at least the first surface portion comprises first physical indicia indicative of a first dental restoration color associated with the first surface portion, wherein the second surface portion comprises second physical indicia indicative of a second dental restoration color associated with the second surface portion, and wherein the second physical indicia are formed by a surface structure which comprises second surface structure elements of a repetitive geometrically defined shape.

7. The method of claim 6, wherein the second surface structure elements comprise a plurality of uniformly spaced elongated bulges, or a plurality of projections of a repetitive shape.

8. The method of claim 7, wherein the bulges extend parallel relative to each other, and wherein the shape of the projections is selected from the group consisting of a circular area, a hexagonal area or a rectangular area.

9. The method of claim 6, wherein the physical boundary structure is formed by a change-over between the first and the second surface structure elements.

10. The method of claim 1, wherein at least the first physical indicia is selected from the group consisting of a code, a digit, a character, alphanumerical information or symbols.

11. The method of claim 1, wherein the physical boundary structure is formed by a continuous bulge protruding from the dental restoration precursor.

12. The method of claim 1, further comprising:
providing a virtual three-dimensional model of the dental restoration;

defining a first boundary of the first surface portion associated with a desired first dental restoration color;

defining a second boundary of the second surface portion associated with a desired second dental restoration color;

along at least a portion of the first boundary and the second boundary in which the first boundary and the second boundary coincide, building up a virtual boundary structure; and creating a three-dimensional model of the dental restoration precursor based on the virtual three-dimensional model of the dental restoration and the virtual boundary structure.

* * * * *